(12) United States Patent
Sakuma et al.

(10) Patent No.: US 8,541,917 B2
(45) Date of Patent: Sep. 24, 2013

(54) ROTARY ELECTRICAL MACHINE

(75) Inventors: Masafumi Sakuma, Chiryu (JP);
Tomohiro Sato, Toyoake (JP)

(73) Assignee: Aisin Seiki Kabushiki Kaisha,
Kariya-Shi, Aichi-Ken (JP)

( * ) Notice: Subject to any disclaimer, the term of this patent is extended or adjusted under 35 U.S.C. 154(b) by 309 days.

(21) Appl. No.: 13/035,214

(22) Filed: Feb. 25, 2011

(65) Prior Publication Data
US 2011/0215666 A1 Sep. 8, 2011

(30) Foreign Application Priority Data

Mar. 3, 2010 (JP) ................................ 2010-046458

(51) Int. Cl.
*H02K 5/00* (2006.01)
(52) U.S. Cl.
USPC ............................................. 310/89; 29/596
(58) Field of Classification Search
USPC ............. 310/89, 91, 400, 402, 406, 407, 413, 310/418; 29/596
See application file for complete search history.

(56) References Cited

U.S. PATENT DOCUMENTS

| 6,215,208 | B1* | 4/2001 | Kakizawa et al. ...... 310/40 MM |
| 6,274,957 | B1* | 8/2001 | Mahn et al. ...................... 310/89 |
| 7,586,227 | B2* | 9/2009 | Spaggiari ......................... 310/85 |

FOREIGN PATENT DOCUMENTS

| JP | 2003-244918 A | 8/2003 |
| JP | 2006-224736 A | 8/2006 |
| JP | 2008-193806 A | 8/2008 |
| JP | 2008-271680 A | 11/2008 |

* cited by examiner

*Primary Examiner* — Dang Le
(74) *Attorney, Agent, or Firm* — Buchanan Ingersoll & Rooney PC

(57) ABSTRACT

A stator assembly structure of a rotary electrical machine for assembling a stator on a case includes the stator including a stator holder and a stator core, the stator holder including a flange portion that includes a plurality of positioning bores arranged at intervals and a fixing portion fixing the stator to the case, the case including a positioning pin having an outer diameter smaller than a diameter of each of the positioning bores and being engageable with each of the positioning bores, the case further including a fixing seat, and each of the positioning bores including at least three bending portions that extend from a peripheral edge of the positioning bore towards a radially inward side, each of the bending portions being formed to be bent at a portion in a length direction from the peripheral edge towards the radially inward side relative to the flange portion.

10 Claims, 8 Drawing Sheets

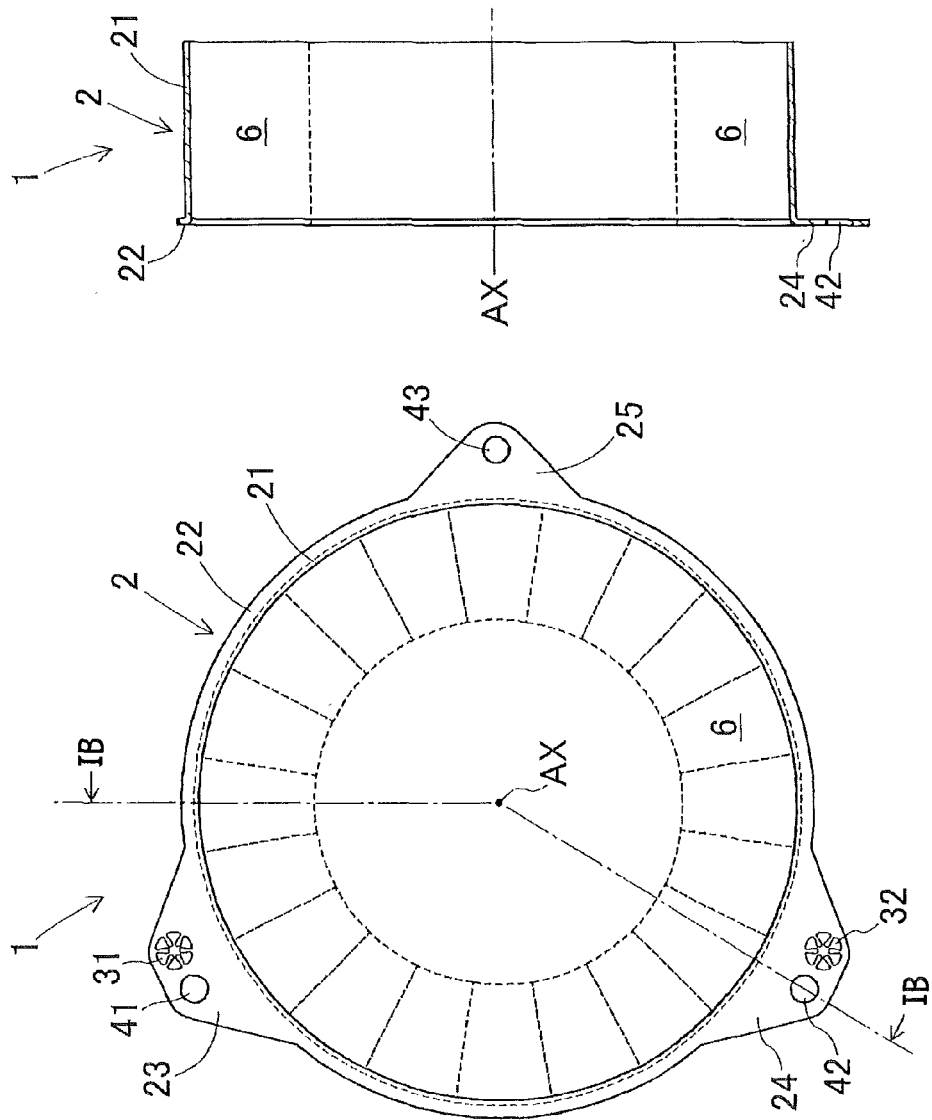

F I G. 9 A
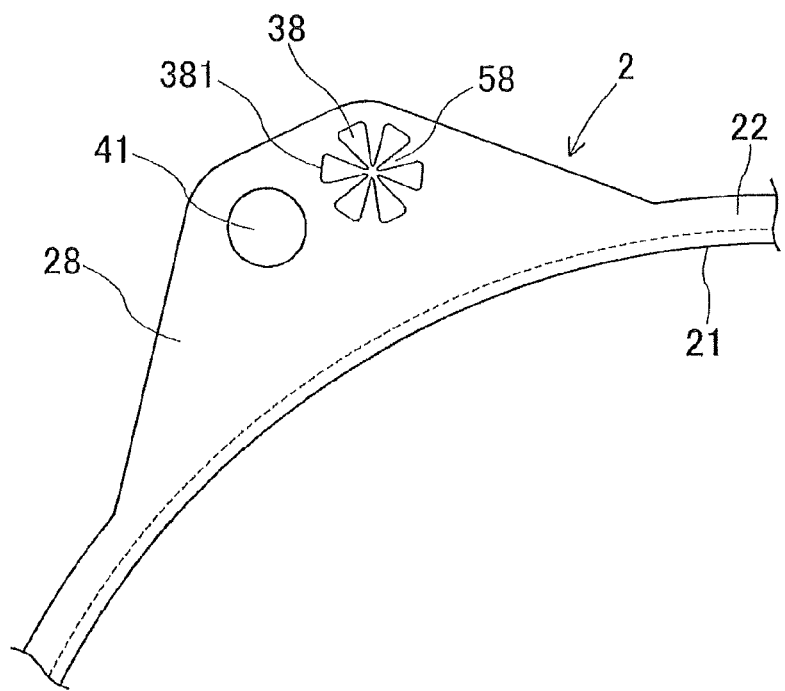
F I G. 9 B
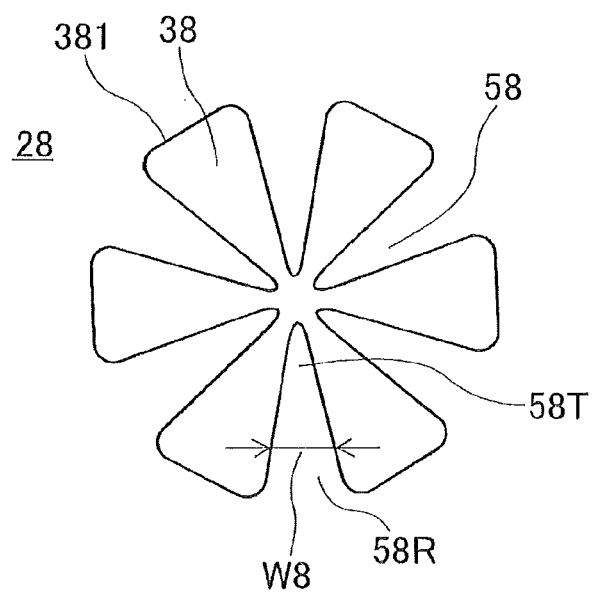

ROTARY ELECTRICAL MACHINE

CROSS REFERENCE TO RELATED APPLICATIONS

This application is based on and claims priority under 35 U.S.C. §119 to Japanese Patent Application 2010-046458, filed on Mar. 3, 2010, the entire content of which is incorporated herein by reference.

TECHNICAL FIELD

This disclosure relates to a rotary electrical machine. More particularly, the disclosure pertains to a stator assembly structure and method of a rotary electrical machine.

BACKGROUND DISCUSSION

A known rotary electrical machine such as a generator motor mounted at a hybrid vehicle, an electric vehicle, or the like has a magnet inner rotor type in which a stator having a coil is arranged at an outer peripheral side while a rotor having a magnet is arranged at an inner peripheral side. According to the stator in the aforementioned rotary electrical machine, a stator core is formed by a lamination of a laminated material that is obtained by an annular punching of electrical steel and the like (i.e., annular cores). Because of a low yield rate of the annular-shaped laminated material, the stator core formed by a lamination of the laminated material that is divided in a circumferential direction at an even center angle (i.e., divided cores) may be commonly used. The multiple divided cores are integrally fixed to an inner periphery of a cylindrical stator holder by means of an integration technique such as a press-fitting and a shrink-fitting. According to the integration technique, the divided cores and the stator holder are manufactured individually so that an inner diameter of the stator holder is slightly smaller than an outer diameter of each of the divided cores. In case of press-fitting, the divided cores are forcibly pressed against the stator holder by an application of an external force so that the divided cores and the stator holder are integrally formed or molded. In case of shrink-fitting, the stator holder is heated and expanded. Then, after the stator holder accommodates the divided cores, the stator holder is cooled to contract, thereby integrally forming the divided cores and the stator core.

JP2008-193806A discloses an example of an electric motor constituted by a stator. According to the motor disclosed in JP2008-193806A, multiple divided cores (i.e., divided stators) are press-fitted to an inner peripheral surface of a cylindrical-shaped stator holder to thereby obtain the stator. A bending portion is formed at one end of the stator holder so as to bend into an inner peripheral direction. As a result, a torsional strength of the stator holder improves, which leads to a reduction of the number of components. In addition, a vibration noise caused by a decrease of rigidity of the motor is restrained.

At a time of the press-fitting or the shrink-fitting for integrally forming or molding the stator holder and the divided cores as disclosed in JP2008-193806A, a deformation of the stator holder may occur. Thus, according to the stator constituted by the divided cores, a position of a rotational axis may be inaccurate compared to the stator constituted by the annular cores. In a case where the rotational axis of the stator holder (the stator) and a rotational axis of a case of the rotary electrical machine do not mach each other when the stator is assembled on the case, a performance of the rotary electrical machine decreases. As a common means or method to specify a positional relationship or to match rotational axes of two members, which are not limited to the case and the stator, a positioning pin and a positioning bore may be used. That is, the positioning pin is provided at one of the two members while the positioning bore is provided at the other of the two members. The poisoning pin is fitted to the positioning bore to thereby specify the positional relationship of the two members.

However, a process to provide the positioning pin or the positioning bore at the stator holder should be performed after the deformation of the stator holder upon integral molding of the divided cores at the stator holder. That is, the process proceeds from a component manufacturing process to an assembly process, and then returns to the component manufacturing process. As a result, the process shifts back and forth by moving or transferring the stator, an extension of lead time, and a complicated process control in addition to reprocessing of the stator holder may occur.

A need thus exists for a stator assembly structure and method of a rotary electrical machine which is not susceptible to the drawback mentioned above.

SUMMARY

According to an aspect of this disclosure, a stator assembly structure of a rotary electrical machine for assembling a stator on a case includes the stator including a stator holder that has a cylindrical shape and a stator core retained at an inner peripheral surface of the stator holder, the stator holder including a flange portion that extends in a radially outward direction from one axial end of the stator and that includes a plurality of positioning bores arranged at intervals in a circumferential direction of the stator, the stator holder further including a fixing portion fixing the stator to the case, the case including a positioning pin having an outer diameter smaller than a diameter of each of the positioning bores of the flange portion, the positioning pin being engageable with each of the positioning bores, the case further including a fixing seat fixing the fixing portion of the stator holder, and each of the positioning bores of the flange portion of the stator holder including at least three bending portions that extend from a peripheral edge of the positioning bore towards a radially inward side, each of the bending portions being formed to be bent at a portion in a length direction from the peripheral edge towards the radially inward side relative to the flange portion.

According to another aspect of this disclosure, a stator assembly method of a rotary electrical machine for assembling a stator on a case, the stator including a stator holder that has a cylindrical shape and a stator core retained at an inner peripheral surface of the stator holder, the stator holder including a flange portion that extends in a radially outward direction from one axial end of the stator and that includes a plurality of positioning bores arranged at intervals in a circumferential direction of the stator, the stator holder further including a fixing portion fixing the stator to the case, the case including a positioning pin having an outer diameter smaller than a diameter of each of the positioning bores of the flange portion, the positioning pin being engageable with each of the positioning bores, the case further including a fixing seat fixing the fixing portion of the stator holder, each of the positioning bores of the flange portion of the stator holder including at least thee bending portions that extend from a peripheral edge of each of the positioning bores towards a radially inner side, the stator assembly method includes a bending process bending each of the bending portions at a portion in a length direction from the peripheral edge towards the radially inner side relative to each of the flange portions while conforming to an outer diameter and an arrangement of the positioning pin of the case so as to define an assembly position of the stator, an inserting process inserting the stator into the case so that the positioning pin of the case is fitted to each center position that is defined by the bending portions being bent, and a fixing process fixing the fixing portion of the stator holder to the fixing seat of the case in a state where the positioning pin is fitted to the center position.

BRIEF DESCRIPTION OF THE DRAWINGS

The foregoing and additional features and characteristics of this disclosure will become more apparent from the following detailed description considered with the reference to the accompanying drawings, wherein:

FIG. 1A is a front view of a stator for explaining an assembly structure thereof according to a first embodiment disclosed here;

FIG. 1B is a cross-sectional view taken along the line IB-IB illustrated in FIG. 1A;

FIG. 9A is a front view of a first flange portion according to a third embodiment; and FIG. 9B is an enlarged front view of a first positioning bore and bending portions formed at the first flange portion according to the third embodiment.

DETAILED DESCRIPTION

Figure 2A:
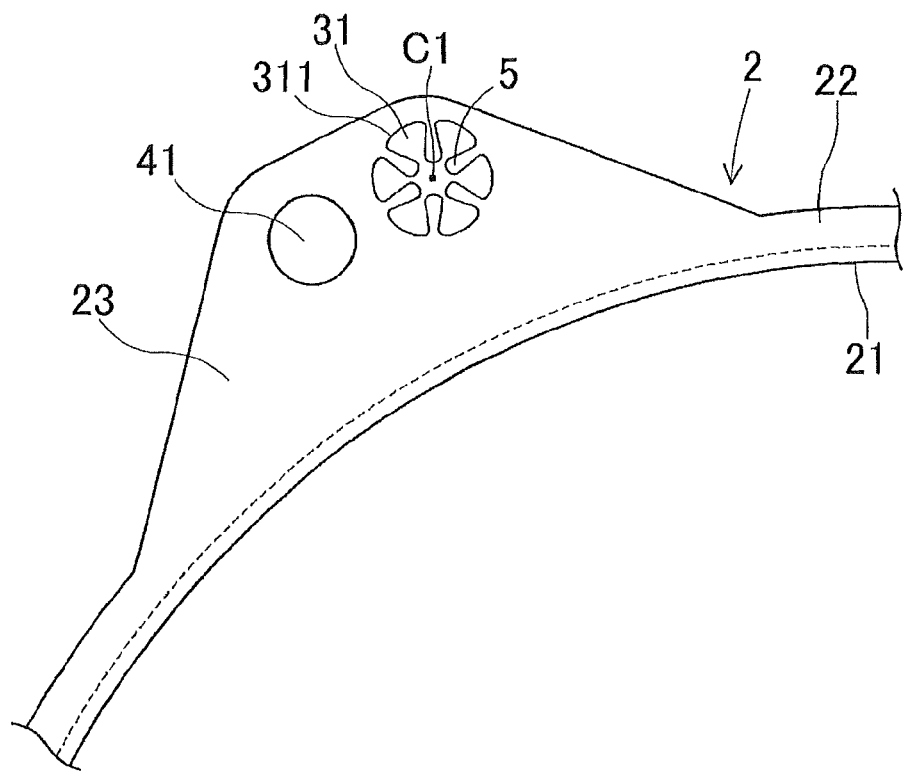
FIG. 2A is a front view of a first flange portion according to the first embodiment.

A stator assembly structure and method of a rotary electrical machine according to a first embodiment will be explained with reference to FIGS. 1 to 6. As illustrated in FIGS. 1A and 1B, a stator 1 is used for a generator motor of a magnet inner rotor type. The stator 1 is substantially axisymmetric relative to a rotational axis AX of the rotary electrical machine. The stator 1 includes a stator holder 2 and a stator core 6.

The stator holder 2 is a metallic member having a cylindrical shape. As illustrated in FIG. 1B, an edge of a cylindrical portion 21 of the stator holder 2 (i.e., one axial end of the cylindrical portion 21), which is positioned at a left side of the cylindrical portion 21 in FIG. 1B, forms a chamfer portion 22.

The chamfer portion 22 is bent to slightly extend in a radially outward direction over an entire circumference of the cylindrical portion 21. First, second, and third flange portions 23, 24, and 25 are formed so as to be connected to an outer circumference of the chamfer portion 22. Specifically, the first to third flange portions 23 to 25 are arranged at three portions at even intervals while extending radially outwardly. The first to third flange portions 23 to 25 are formed by a bending process or a welding process. The first flange portion 23 is substantially formed into an isosceles trapezoid. A first positioning bore 31 and a first fixing bore 41 serving as a fixing portion are formed in a penetrating manner at the first flange portion 23 so as to be arranged side by side in a circumferential direction. As illustrated in FIG. 1A, the second flange portion 24 is symmetric relative to the first flange portion 23. A second positioning bore 32 and a second fixing bore 42 serving as the fixing portion are formed in a penetrating manner at the second flange portion 24. In addition, the third flange portion 25 is substantially formed into an isosceles equilateral triangle. Only a third fixing bore 43 serving as the fixing portion is formed at the third flange portion 25.

The stator core 6 is constituted by multiple divided cores, specifically, twenty divided cores according to the first embodiment, as illustrated by a dashed line in FIG. 1A. The multiple divided cores are annularly arranged. The divided cores are press-fitted to the cylindrical portion 21 of the stator holder 2 in a direction where the chamfer portion 22 is provided so as to be integrally formed or molded with the stator holder 2. The rotational axis AX substantially matches an axis of the stator holder 2. At this time, however, a deformation of the stator holder 2 upon press-fitting should be considered. Therefore, in a precise sense, the axis of the stator holder 2 is defined by an inner peripheral surface of the stator core 6 after the press-fitting.

Figure 2B:
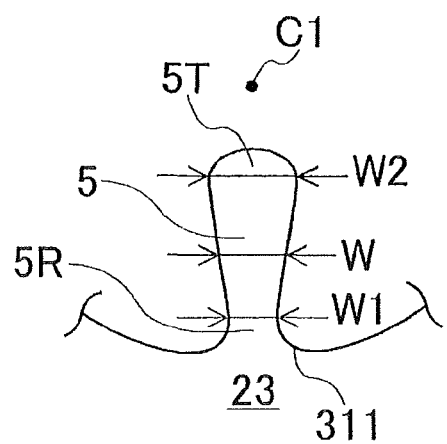
FIG. 2B is an enlarged front view of one of bending portions of a first positioning bore formed at the first flange portion according to the first embodiment.

As illustrated in FIGS. 2A and 2B, the first positioning bore 31 includes six bending portions 5 that are arranged in rotation symmetry having a center line C1 of the bore 31 at 60 degrees intervals. The center line C1 of the first positioning bore 31 is perpendicular to the first flange portion 23 and parallel to the rotational axis AX. Each of the bending portions 5 extends from a peripheral edge 311 of the first positioning bore 31 towards the center line C1. As illustrated in FIG. 2B, a width W of the bending portion 5 is relatively small at a base 5R thereof in the vicinity of the peripheral edge 311 and is relatively large at a tip end 5T. That is, a width W1 is defined at the base 5R of the bending portion 5 while a width W2 is defined at the tip end 5T of the bending portion 5. The width W of the bending portion 5 gradually increases in a length direction thereof from the peripheral edge 311 to the center line C1. Each of the bending portions 5 is bent at an appropriate portion in the length direction relative to the first flange portion 23 before the stator 1 is assembled on a case 8 (see FIG. 6). According to the present embodiment, the bending portion 5 is bent at a right angle.

The first fixing bore 41 is the fixing portion at which the stator 1 is fixed to the case 8. The first fixing bore 41 has a larger diameter than an outer diameter of a fixing bolt 85, which will be explained later. The first positioning bore 31, each of the bending portions 5, and the fixing bore 41 are formed by one punching process at the first flange portion 23. A shape of the second positioning bore 32 of the second flange portion 24 is the same as that of the first poisoning bore 31 of the first flange portion 23. Six bending portions 5 are formed at the second flange portion 24. Each shape of the second fixing bore 42 of the second flange portion 24 and the third fixing bore 43 of the third flange portion 25 is the same as that of the first fixing bore 41.

Figure 3A:
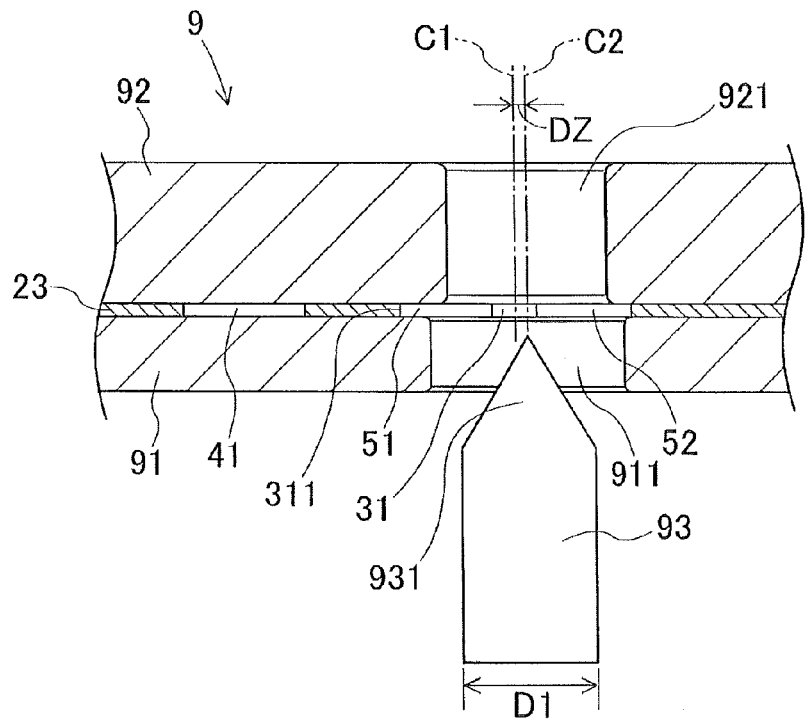
FIG. 3A is a side cross-sectional view of the first flange portion before the bending portions are bent.
Figure 3B:
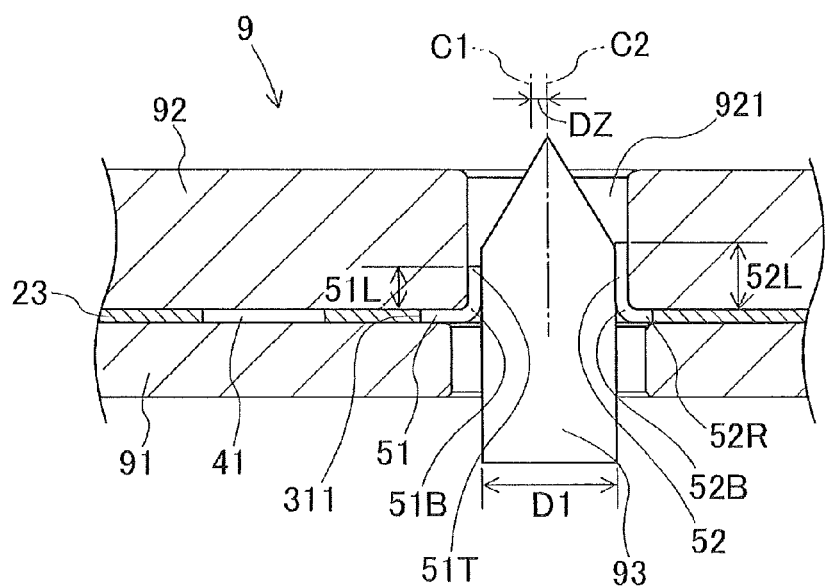
FIG. 3B is a side cross-sectional view of the first flange portion after the bending portions are bent.

Next, a method for assembling the stator 1 on the case 8 (i.e., a stator assembly method) according to the first embodiment will be explained. According to the first embodiment, the stator assembly method includes a bending process, an inserting process, and a fixing process. FIGS. 3A and 3B are side cross-sectional views of the first flange portion 23 for explaining the bending process.

In the bending process as illustrated in FIGS. 3A and 3B, a jig 9 operated by hand is used. In FIG. 3A, the jig 9 is attached to the stator 1. The jig 9 includes a first retaining member 91, a second retaining member 92, and a process pin 93. The first retaining member 91 is attachable to the stator 1 so as to conform to an inner peripheral surface of the stator core 6. The first retaining member 91 is arranged so as to make contact with one side surface of each of the first and second flange portions 23 and 24. The second retaining member 92 is arranged so as to make contact with the other side surface of each of the first and second flange portions 23 and 24. The first and second retaining members 91 and 92 operate together so as to sandwich or retain the first and second flange portions 23 and 24. The first and second retaining members 91 and 92 are tightened and fixed to the first and second flange portions 23 and 24 by means of a tightening member. Process bores 911 and 921 are formed at the first and second retaining members 91 and 92 respectively so that each of the process bores 911 and 921 conforms to an outer diameter D2 of a positioning pin 81 and an arrangement thereof that is provided at the case 8 in a projecting manner. In addition, the process pin 93 is arranged while having a center line C2, which is also applied to the process bores 911 and 921. An outer diameter D1 of the process pin 93 is slightly larger than the outer diameter D2 of the positioning pin 81 formed at the case 8. An end portion 931 of the process pin 93 is formed into a sharp cone shape. The process pin 93 is movable in a direction perpendicular to the first and second flange portions 23 and 24 and is operable by hand.

FIG. 3A illustrates a state where the first flange portion 23 of the stator holder 2 of the stator 1 is retained by the jig 9. At this time, the second flange portion 24 is also retained by the jig 9. In the following, only the first flange portion 23 will be explained but the explanation also applies to the second flange portion 24. In FIG. 3A, the center line C2 of the process pin 93 of the jig 9 is displaced by a displacement amount DZ relative to the center line C1 of the first positioning bore 31 of the stator 1. Such displacement may be caused by a deformation of the stator holder 2 when the stator core 6 is integrally molded thereto. Thus, the displacement amount DZ is not a constant value and is variable, so that an individual difference may occur depending on the stator 1.

Figure 4:
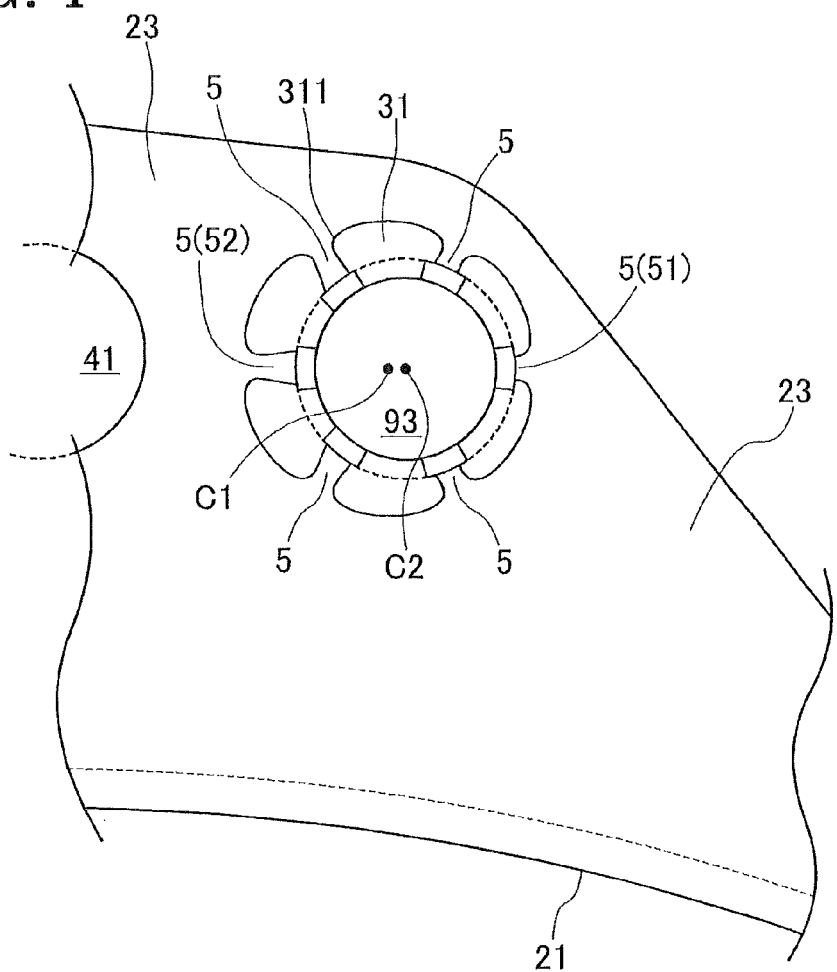
FIG. 4 is a front view of the first positioning bore after the bending portions are bent.

In a case where the process pin 93 is moved upward from a downward position in FIG. 3A, six bending portions 5 are pressed by the process pin 93 so as to make contact with a peripheral surface of the process bore 921 of the second retaining member 92. Each of the bending portions 5 is substantially bent at a right angle relative to the first flange portion 23 as illustrated in FIG. 3B. In FIG. 3A, only two of the bending portions, i.e., bending portions 51 and 52 are illustrated. In the bending portion 51 positioned at a left side in FIG. 3B, a bending position 51B is close to a tip end 51T and thus a bending length 51L is relatively short. On the other hand, in the bending portion 52 positioned at a right side in FIG. 3B, a bending position 52B is close to a base 52R and thus a bending length 52L is relatively long. FIG. 4 is an upper view of FIG. 3B illustrating a state after the bending portions 5 are bent. In FIG. 4, the second retaining member 92 is omitted and the peripheral surface of the process bore 921 is illustrated by a dashed line. A center position defined by the six bending portions 5 (51, 52) matches the center line C2 of the process pin 93. That is, the center position (which will be hereinafter referred to as the center position C2) defined by the six bending portions 5 (51, 52) is displaced from the center line C1 of the first positioning bore 31 so as to conform to the arrangement of the positioning pin 81 provided at the case 8.

Figure 5:
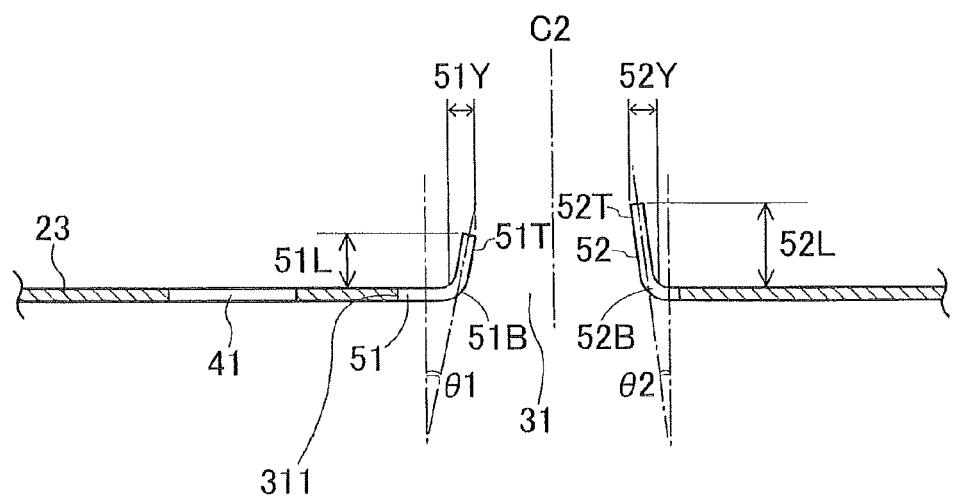
FIG. 5 is a side cross-sectional view for explaining an elastic return force after the bending portions are bent.

Next, in a case where the jig 9 is removed from the stator 1, an elastic return force (a spring back force) is applied to each of the bending portions 5. As illustrated in FIG. 5, even when a deformation processing is performed on the bending portions 5 so that each of the bending portions 5 is bent at a right angle by means of the jig 9, an actual bending angle of each of the bending portions 5 slightly decreases from the right angle because of elasticity (such decrease of the angle is called a return angle). The tip end 51T and a tip end 52T of the bending portions 51 and 52 are displaced in a radially inward direction of the positioning bore 31 relative to the bending positions 51B and 52B by elastic return amounts 51Y and 52Y respectively. In the bending portion 51 positioned at the left side in FIG. 5, the bending position 51B is close to the tip end 51T. Thus, because the width W2 is relatively large, a return angle θ1 is relatively large. On the other hand, in the bending portion 52 positioned at the right side in FIG. 5, the bending position 52B is close to the base 52R. Thus, because the width W1 is relatively small, a return angle θ2 is relatively small. The elastic return amount 51Y is approximated by a formula 1 below obtained by a product of a sine function between the bending length 51L and the return angle θ1. The elastic return amount 52Y is approximated by a formula 2 below obtained by a product of a sine function between the bending length 52L and the return angle θ2.

$$\text{Elastic return amount } 51Y = \text{Bending length } 51L \times \sin\theta 1 \quad \text{[Formula 1]}$$

$$\text{Elastic return amount } 52Y = \text{Bending length } 52L \times \sin\theta 2 \quad \text{[Formula 2]}$$

At this time, the bending length 51L is smaller than the bending length 52L while the return angle θ1 is greater than the return angle θ2. Thus, a value of sin θ1 is greater than a value of sin θ2. That is, a magnitude correlation between the first term and the second term on the right side of the formula 1 is opposite from that of the formula 2. Thus, the elastic return amounts 51Y and 52Y are substantially the same as each other. Further, because the width W of the bending portion 5 gradually increases in the length direction towards the tip end 5T, the elastic return amount is substantially constant in the bending portion regardless of the bending position thereof. Consequently, a center position defined by the tip ends 51T and 52T of the bending portions 51 and 52 matches the center position C2 defined by the bending positions 51B and 52B. A positioning accuracy of the stator 1 is enhanced while an influence of the elastic return amounts 51Y or 52Y is cancelled.

Further, according to the second positioning bore 32 of the second flange portion 24, the bending process is performed on the six bending portions 5 to thereby define the center position. Thus, because of the two center positions C2 of the first and second positioning bores 31 and 32, a correct or target assembly position (an assembly position) of the stator 1 is determined.

Figure 6:
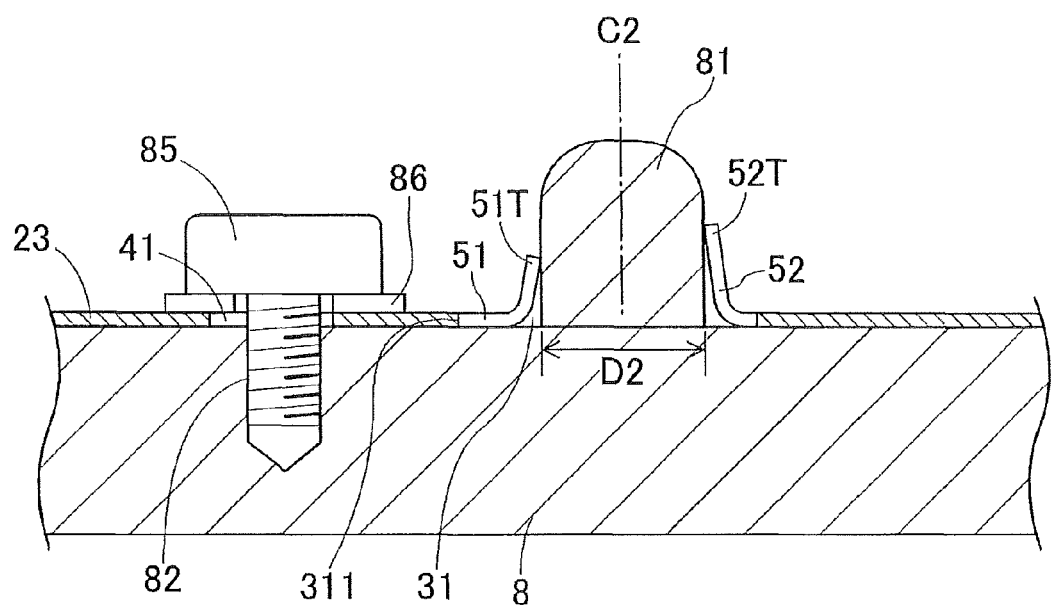
FIG. 6 is a side cross-sectional view illustrating an assembly state of the stator for explaining an inserting process and a fixing process.

The inserting process is performed after the bending process. FIG. 6 is a side cross-sectional view illustrating the assembly state of the stator 1 for explaining the inserting process and the fixing process. The case 8 includes the two column-shaped positioning pins 81 each having the outer diameter D2. Each end portion of the positioning pins 81 is chamfered to form a round shape. Positions of the two positioning pins 81 at the case 8 are specified so that the positioning pins 81 face the first and second positioning bores 31 and 32 respectively in a case where the stator 1 is inserted into the case 8. The positioning pins 81 are engageable with the first and second positioning bores 31 and 32 respectively. In addition, the case 8 includes three screw bores 82 serving as fixing seats. Positions of the three screw bores 82 are specified so that the screw bores 82 face the first to third fixing bores 41, 42, and 43 respectively in a case where the stator 1 is inserted into the case 8. In the inserting process, the stator 1 is inserted into the case 8 so that each of the positioning pins 81 of the case 8 is aligned and fitted to the center position C2 defined by the bending portions 51 and 52 of each of the first and second positioning bores 31 and 32. At this time, the positioning pin 81 is fitted to the center position C2 by slidably contacting the tip ends 51T and 52T of the bending portions 51 and 52. Further, the stator 1 is inserted into the case 8 while the insertion state of the stator 1 is visually confirmed, thereby improving the insertion efficiency.

In the fixing process, which is the last process, the fixing bores 41 to 43 of the stator holder 2 are fixed to the screw bores 82 of the case 8 by means of the fixing bolts 85 respectively in a state where each of the positioning pins 81 is fitted to the center position C2. The fixing bolts 85 penetrate through the fixing bores 41, 42, and 43 via washers 86 respectively so as to be meshed with and fixed to the respective screw bores 82. At this time, the fixing bolts 85 are tightened while the insertion state of the stator 1 is visually confirmed, thereby improving the fixing efficiency.

According to the stator assembly structure and method of the first embodiment, the first and second positioning bores 31, 32 and the bending portions 5 of the first and second flange portions 23 and 24 of the stator holder 2 are formed by a punching by a machine tool in a component manufacturing process. Because of a small process operation force, the bending process of each of the bending portions 5 (51, 52) is achievable by hand during the assembly process with a usage of the jig 9 having the simple structure. Therefore, after the stator core 6 and the stator holder 2 are press-fitted to each other to be integrally formed or molded, the bending positions 51B and 52B of the bending portions 51 and 52 are adjusted to thereby define the center position C2. Even when the deformation occurs at a time of the integral molding of the stator core 6 and the stator holder 2, such deformation is cancelled, which leads to an improved positioning accuracy of the stator 1. Further, because of a simple structure where the bending portions 5 (51, 52) are simply added to the first and second positioning bores 31 and 32, the component manufacturing and the assembly operation are simplified. Further, after the integral molding, it is not necessary to return the process to the component manufacturing process so that the first and second positioning bores 31 and 32 are formed by punching by a machine tool. The assembly process of the stator 1 is effective accordingly.

A second embodiment will be explained with reference to FIGS. 7A, 7B, FIGS. 8A and 8B. A structure of the second embodiment except for the bending portions is similar to that of the first embodiment. An explanation of the similar structure of the second embodiment to that of the first embodiment will be omitted.

Figure 7A:
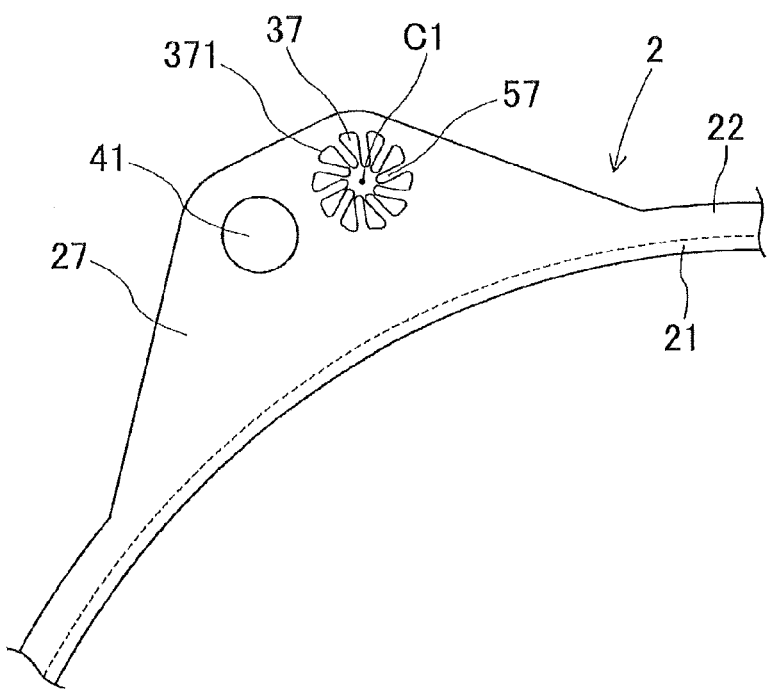
FIG. 7A is a front view of a first flange portion according to a second embodiment disclosed here.
Figure 7B:
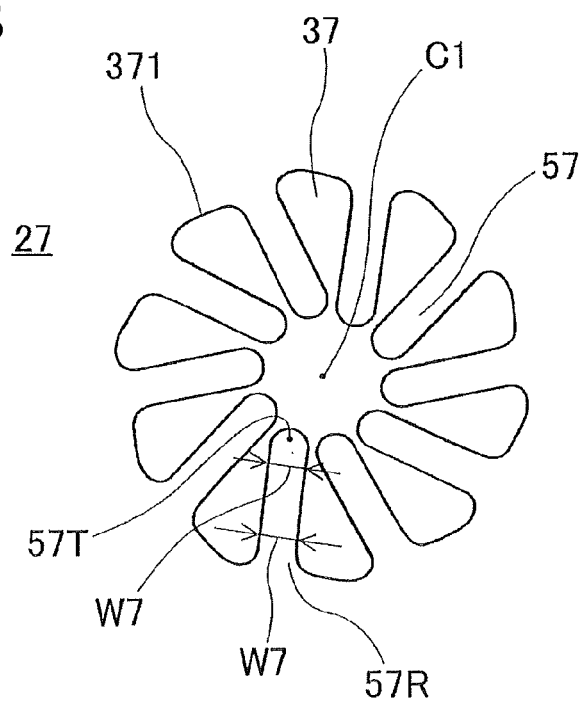
FIG. 7B is an enlarged front view of a first positioning bore and bending portions formed at the first flange portion according to the second embodiment.

As illustrated in FIGS. 7A and 7B, a first positioning bore 37 includes ten bending portions 57 that extend from a peripheral edge 371 of the first positioning bore 37 so as to incline in an identical rotation direction. The center line C1 of the first positioning bore 37 is perpendicular to a first flange portion 27 and is parallel to the rotational axis AX. The bending portions 57 extend from the peripheral edge 371 of the first positioning bore 37 while inclining in a clockwise direction in FIGS. 7A and 7B. As illustrated in FIG. 7B, a width W7 of each of the bending portions 57 is constant in the length direction thereof from a base 57R to a tip end 57T.

Figure 8A:
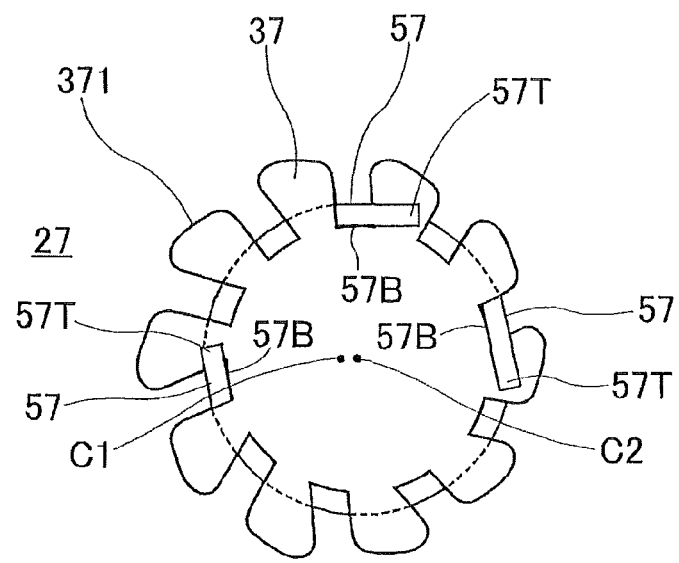
FIG. 8A is a front view of the first positioning bore after the bending portions are bent according to the second embodiment.
Figure 8B:
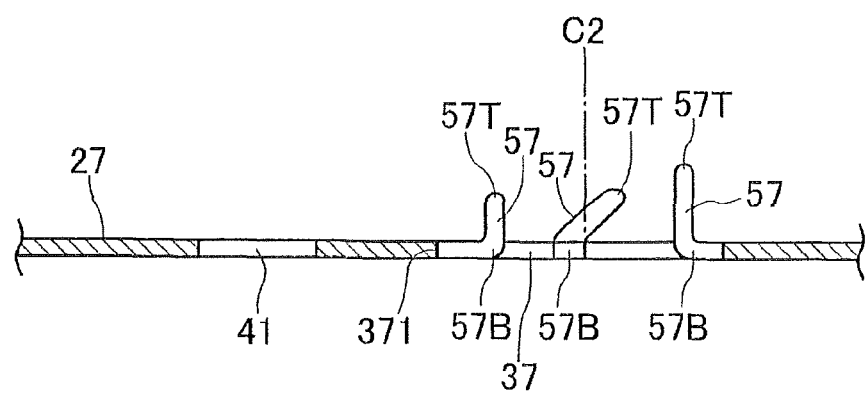
FIG. 8B is a side cross-sectional view of the first positioning bore after the bending portions are bent according to the second embodiment.

According to the second embodiment, when the bending portions 57 are bent, states illustrated in FIGS. 8A and 8B are obtained. In FIGS. 8A and 8B, only three of the bending portions 57 are illustrated for the purpose of simple explanation though ten of the bending portions 57 are practically provided. In FIGS. 8A and 8B, because the bending portions 57 extend from the peripheral edge 371 of the first positioning bore 37 so as to incline in the clockwise direction, the bending portions 57 are bent to project in an inclining manner. Then, the tip ends 57T of the bending portions 57 respectively are positioned away from the center line C1. As a result, the tip ends 57T of the bending portions 57 are arranged radially outwardly from a cylindrical surface that passes through bending positions 57B of the bending portions 57. Accordingly, the center position defined by the bending portions 57, i.e., the center position C2, is not influenced by the elastic return force. As a result, the positioning accuracy of the stator 1 increases.

Next, a third embodiment will be explained with reference to FIGS. 9A and 9B. A structure of the third embodiment except for the bending portions is similar to that of the first or second embodiment. An explanation of the similar structure of the third embodiment to that of the first or second embodiment will be omitted.

As illustrated in FIGS. 9A and 9B, a first positioning bore 38 provided at a first flange portion 28 includes six bending portions 58 that are arranged in rotation symmetry with the center line C1 of the first positioning bore 38 at 60 degrees intervals. A width W8 of each of the bending portions 58 is relatively large at a base 58R in the vicinity of a peripheral edge 381 of the first positioning bore 38 and is relatively small at a tip end 58T. The width W8 gradually decreases in a length direction of the first positioning bore 38 towards the tip end 58T.

According to the third embodiment, as well as the first and second embodiments, the bending process of each of the bending portions 58 achieves the positioning of the stator 1.

The number of bending portions formed at the positioning bore is six according to the first and third embodiments, and is ten according to the second embodiment. The number of bending portions is not limited to the aforementioned number and may be at least three for defining the center position. In addition, the shape of the bending portion is not limited to the aforementioned shape. The first to third flange portions 23 to 25, 27, and 28 may be formed at a full circumference at the circumferential edge of the stator holder 2. The combination of the fixing bores 41 to 43, the screw bores 82, and the fixing bolts 85 may be appropriately determined. The aforementioned embodiments may be appropriately modified.

According to the aforementioned first to third embodiments, each of the positioning bores 31, 32, 37, 38 of the flange portion 23 to 25, 27, 28 of the stator holder 2 includes at least three bending portions 5, 51, 52, 57, 58. Each of the bending portions 5, 51, 52, 57, 58 is bent at any portion in the length direction thereof from the peripheral edge 311, 371, 381 of the positioning bore 31, 32, 37, 38 towards the radially inner side. By the adjustment of the bending positions 51B, 52B, 57B of the respective three bending portions 5, 51, 52, 57, 58, the center position defined by at least the three bending portions 5, 51, 52, 57, 58 that are bent is adjustable. In addition, the center position of each of the multiple positioning bores 31, 32, 37, 38 is adjusted to thereby define the assembly position of the stator 1. Therefore, the positioning pin 81 provided at the case 8 is fitted to each of the center positions defined by the bending portions 5, 51, 52, 57, 58, which are provided at the stator 1, to thereby match the rotational axes of the stator 1 and the case 8 for positioning.

At this time, the positioning bores 31, 32, 37, 38 and the bending portions 5, 51, 52, 57, 58 of the flange portion 23 to 25, 27, 28 of the stator holder 2 are formed by punching by a machine tool during a component manufacturing process. The bending process of the bending portions 5, 51, 52, 57, 58 is performed by hand using a simple jig during the stator assembly process because of a small process operation force. Accordingly, after the stator core 6 and the stator holder 2 are integrally molded, the bending position 51B, 52B, 57B of each of the bending portions 5, 51, 52, 57, 58 is adjusted to specify the center position C2. Even when a deformation occurs during the integral molding, an influence thereof may be cancelled, which leads to a highly accurate positioning of the stator 1. In addition, because of a simple structure in which the bending portions 5, 51, 52, 57, 58 are only added to a known positioning bores 31, 32, 37, 38, a component manufacture and an assembly operation may be simplified. Further, the component manufacturing process is not necessarily performed again after the integral molding so as to punch the positioning bores 31, 32, 37, 38 by the machine tool. As a result, the effective operation is obtained.

The at least three bending portions 5, 51, 52, 57, 58 extend from the peripheral edge 311, 371, 381 of each of the positioning bores 31, 32, 37, 38 towards the center of each of the positioning bores 31, 32, 37, 38 and the width W, W7, W8 of each of the bending portions 5, 51, 52, 57, 58 gradually increases in the length direction towards the center of the positioning bore 31, 32, 37, 38.

Accordingly, an influence of the elastic return force (i.e., the spring back force) that is generated when the bending portion 5, 51, 52, 57, 58 is bent at any bending position relative to the flange portion 23 to 25, 27, 28 may be avoided, thereby increasing the positioning accuracy of the stator 1. Specifically, even when a deformation processing is performed on the bending portions 5, 51, 52, 57, 58 so that each of the bending portions 5, 51, 52, 57, 58 is bent at any bending position, the actual bending angle slightly decreases because of elasticity (such decrease of the angle is called a return angle). A tip end 5T, 51T, 52T, 57T, 58T of the bending portion 5, 51, 52, 57, 58 is displaced by an elastic return amount in a radially inward direction of the positioning bore 31, 32, 37, 38 relative to the bending position 51B, 52B, 57B. At this time, the return angle increases in association with an increase of the width W, W7, W8 of the bending portion 5, 51, 52, 57, 58. Thus, when the bending portion 5, 51, 52, 57, 58 is bent at the tip end 5T, 51T, 52T, 57T, 58T thereof in the vicinity of a radially inner side of the positioning bore 31, 32, 37, 38, the width W, W7, W8 is large so that the return angle is large while the bending length is short. In addition, when the bending portion 5, 51, 52, 57, 58 is bent at the base 5R, 51R, 52R, 57R, 58R thereof in the vicinity of the peripheral edge 311, 371, 381 of the positioning bore 31, 32, 37, 38, the width W, W7, W8 is small so that the return angle is small while the bending length is long. Accordingly, the elastic return force (amount), which is determined depending on the bending length and the return angle, is substantially constant in the bending portion 5, 51, 52, 57, 58 regardless of the bending position thereof. That is, the center position defined by the tip ends 5T, 51T, 52T, 57T, 58T of the respective bending portions 5, 51, 52, 57, 58 each of which is displaced by the elastic return amount substantially matches the center position that is defined by the bending positions of the bending portions 5, 51, 52, 57, 58. The influence of the elastic return force is cancelled to thereby improve the positioning accuracy of the stator 1.

According to the aforementioned second embodiment, the at least three bending portions 57 extend from the peripheral edge 371 of each of the positioning bores 37 while inclining in an identical rotation direction, and the width W7 of each of the bending portions 57 is constant in the length direction.

Therefore, the influence of the elastic return force that is generated when each of the bending portions 57 is bent at any bending position relative to the flange portion 27 is not applied, thereby improving the positioning accuracy of the stator 1. Specifically, even when the deformation processing is performed on the bending portions 57 so that each of the bending portions 57 is bent at any bending position, the actual bending angle slightly decreases because of elasticity. However, because the bending portions 57 extend from the peripheral edge 371 of the positioning bore 37 while inclining in the identical rotation direction, the bending portions 57 are bent to project in an inclining manner. The tip ends 57T of the respective bending portions 57 are positioned away from the center of the positioning bore 37. Therefore, the tip ends 57T of the bending portions 57 are arranged radially outwardly relative to the cylindrical surface that passes through the bending positions 57B of the bending portions 57. The center position is defined without the influence of the elastic return force.

The fixing portion of the stator holder 2 includes a plurality of fixing bores 41, 42, 43 formed at intervals in the circumferential direction at the flange portion 23-25, 27, 28.

Accordingly, in addition to the positioning bores 31, 32, 37, 38 and the bending portions 5, 51, 52, 57, 58, the multiple fixing bores 41, 42, 43 are formed at the flange portion 23 to 25, 27, 28 of the stator holder 2, which achieves a simple structure. In addition, the positioning bores 31, 32, 37, 38, the bending portions 5, 51, 52, 57, 58 and the fixing bores 41, 42, 43 are formed by one punch, which may lead to the effective component manufacturing. Further, the stator 1 is inserted and fixed to the case 8 while the fitting state of the positioning pin 81 to the center position that is defied by the bending portions being bent is visually confirmed. As a result, the assembly effectiveness is improved.

Each of the positioning bores 31, 32, 37, 38 and the fixing bore 41, 42, 43 are arranged side by side in the circumferential direction at the flange portion 23-25, 27, 28.

According to the aforementioned third embodiment, six of the bending portions 58 are arranged in rotation symmetry with a center line (C1) of each of the positioning bores 38 at 60 degrees intervals.

According to the aforementioned first to third embodiments, the flange portion includes the first to third flange portions 23-25, 27, 28 that extend in the radially outward direction of the stator holder 2, the plurality of positioning bores includes the first and second positioning bores 31, 32, and the fixing portion includes first to third fixing bores 41 to 43, the first positioning bore 31 and the first fixing bore 41 being formed at the first flange portion 23, the second positioning bore 32 and the second fixing bore 42 being formed at the second flange portion 24, the third fixing bore 43 and none of the positioning bores being formed at the third flange portion 25.

The positioning pin 81 has a column shape and an end portion of the positioning pin 81 is chamfered to form a round shape.

According to the aforementioned first to third embodiments, the stator assembly structure is achieved by an execution of the bending process, the inserting process, and the fixing process. Accordingly, the positioning pin 81 provided at the case 8 is fitted to each of the center positions that are defined by the bending portions 5, 51, 52, 57, 58 provided at the stator 1 to thereby match the rotational axes of the stator 1 and the case 8 for positioning. In addition, even when a deformation occurs during the integral molding of the stator core 6 and the stator holder 2, an influence thereof may be cancelled, which leads to a highly accurate positioning of the stator 1. In addition, because of a simple structure in which the bending portions 5, 51, 52, 57, 58 are only added to a known positioning bores, a component manufacture and an assembly operation may be simplified. Further, the component manufacturing process is not necessarily performed again after the integral molding so as to punch the positioning bores 31, 32, 37, 38 by the machine tool. As a result, the effective operation is obtained.

In the bending process, the assembly position of the stator 1 conforms to a position where the rotational axis defined by the inner peripheral surface of the stator core 6 of the stator 1 matches the rotational axis of the case 8.

Accordingly, even when a deformation or torsion occurs upon integral molding of the stator core 6 and the stator holder 2, the positioning of the stator 1 is achieved on a basis of the inner peripheral surface of the stator core 6, which is most important in view of a relationship with the rotor. In order to perform the aforementioned positioning of the stator 1 in the bending process, the jig 9 that is mountable on a basis of the inner peripheral surface of the stator core 6 and that includes the process pin 93 at a position corresponding to the positioning pin 81 of the case 8 is used, for example, so as to perform the bending process on the bending portions 5, 51, 52, 57, 58.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A stator assembly structure of a rotary electrical machine for assembling a stator on a case, comprising:
the stator including a stator holder that has a cylindrical shape and a stator core retained at an inner peripheral surface of the stator holder, the stator holder including a flange portion that extends in a radially outward direction from one axial end of the stator and that includes a plurality of positioning bores arranged at intervals in a circumferential direction of the stator, the stator holder further including a fixing portion fixing the stator to the case;
the case including a positioning pin having an outer diameter smaller than a diameter of each of the positioning bores of the flange portion, the positioning pin being engageable with each of the positioning bores, the case further including a fixing seat fixing the fixing portion of the stator holder; and
each of the positioning bores of the flange portion of the stator holder including at least three bending portions that extend from a peripheral edge of the positioning bore towards a radially inward side, each of the bending portions being formed to be bent at a portion in a length direction from the peripheral edge towards the radially inward side relative to the flange portion.

2. The stator assembly structure according to claim 1, wherein the at least three bending portions extend from the peripheral edge of each of the positioning bores towards a center of each of the positioning bores and a width of each of the bending portions gradually increases in the length direction towards the center of the positioning bore.

3. The stator assembly structure according to claim 1, wherein the at least three bending portions extend from the peripheral edge of each of the positioning bores while inclining in an identical rotation direction, and a width of each of the bending portions is constant in the length direction.

4. The stator assembly structure according to claim 1, wherein the fixing portion of the stator holder includes a plurality of fixing bores formed at intervals in the circumferential direction at the flange portion.

5. The stator assembly structure according to claim 1, wherein each of the positioning bores and the fixing portion are arranged side by side in the circumferential direction at the flange portion.

6. The stator assembly structure according to claim 1, wherein six of the bending portions are arranged in rotation symmetry with a center line of each of the positioning bores at 60 degrees intervals.

7. The stator assembly structure according to claim 1, wherein the flange portion includes first to third flange portions that extend in the radially outward direction of the stator holder, the plurality of positioning bores includes first and second positioning bores, and the fixing portion includes first to third fixing portions, the first positioning bore and the first fixing portion being formed at the first flange portion, the second positioning bore and the second fixing portion being formed at the second flange portion, the third fixing bore and none of the positioning bores being formed at the third flange portion.

8. The stator assembly structure according to claim 1, wherein the positioning pin has a column shape and an end portion of the positioning pin is chamfered to form a round shape.

9. A stator assembly method of a rotary electrical machine for assembling a stator on a case, the stator including a stator holder that has a cylindrical shape and a stator core retained at an inner peripheral surface of the stator holder, the stator holder including a flange portion that extends in a radially outward direction from one axial end of the stator and that includes a plurality of positioning bores arranged at intervals in a circumferential direction of the stator, the stator holder further including a fixing portion fixing the stator to the case, the case including a positioning pin having an outer diameter smaller than a diameter of each of the positioning bores of the flange portion, the positioning pin being engageable with each of the positioning bores, the case further including a fixing seat fixing the fixing portion of the stator holder, each of the positioning bores of the flange portion of the stator holder including at least thee bending portions that extend from a peripheral edge of each of the positioning bores towards a radially inner side, the stator assembly method comprising:
a bending process bending each of the bending portions at a portion in a length direction from the peripheral edge towards the radially inner side relative to each of the flange portions while conforming to an outer diameter and an arrangement of the positioning pin of the case so as to define an assembly position of the stator;

an inserting process inserting the stator into the case so that the positioning pin of the case is fitted to each center position that is defined by the bending portions being bent; and a fixing process fixing the fixing portion of the stator holder to the fixing seat of the case in a state where the positioning pin is fitted to the center position.

10. The stator assembly method according to claim 9, wherein in the bending process, the assembly position of the stator conforms to a position where a rotational axis defined by an inner peripheral surface of the stator core of the stator matches a rotational axis of the case.

\* \* \* \* \*